(12) United States Patent
Cifuentes

(10) Patent No.: US 6,428,597 B1
(45) Date of Patent: Aug. 6, 2002

(54) HEAP LEACH AGGLOMERATION/ PERCOLATION EXTRACTION AIDS FOR ENHANCED GOLD AND SILVER RECOVERY

(75) Inventor: Ricardo A. Cifuentes, Santiago (CL)

(73) Assignee: BetzDearborn Inc., Trevose, PA (US)

( * ) Notice: Subject to any disclaimer, the term of this patent is extended or adjusted under 35 U.S.C. 154(b) by 0 days.

(21) Appl. No.: 09/674,735

(22) PCT Filed: Jun. 3, 1999

(86) PCT No.: PCT/US99/10489

§ 371 (c)(1), (2), (4) Date: Nov. 3, 2000

(87) PCT Pub. No.: WO99/63123

PCT Pub. Date: Dec. 9, 1999

Related U.S. Application Data

(63) Continuation-in-part of application No. 09/090,512, filed on Jun. 4, 1998, now abandoned.

(51) Int. Cl.$^7$ .................................................. C22B 3/12
(52) U.S. Cl. .............................. 75/300; 75/712; 75/722
(58) Field of Search ........................... 75/300, 712, 772

(56) References Cited

U.S. PATENT DOCUMENTS

| | | |
|---|---|---|
| 4,424,122 A | 1/1984 | Parlman et al. |
| 4,751,259 A | 6/1988 | Roe et al. |
| 5,100,631 A | 3/1992 | Gross |
| 5,368,830 A | 11/1994 | Alfano et al. |
| 5,472,675 A | 12/1995 | Polizzotti et al. |
| 5,580,567 A | 12/1996 | Roberts |
| 5,833,937 A | 11/1998 | Kerr |
| 6,099,615 A * | 8/2000 | Underwood ................. 75/772 |

FOREIGN PATENT DOCUMENTS

| | | |
|---|---|---|
| BR | 8800437 | 9/1988 |

* cited by examiner

Primary Examiner—Melvyn Andrews
(74) Attorney, Agent, or Firm—Steven D. Boyd

(57) ABSTRACT

Methods and compositions for increasing the recovery of precious metals from ore during heap leaching operations are disclosed. The methods add polypropylene glycol and alkylphenol ethoxylate in a paraffin oil solvent with the cyanide lixivant to the ore heap.

18 Claims, No Drawings

HEAP LEACH AGGLOMERATION/PERCOLATION EXTRACTION AIDS FOR ENHANCED GOLD AND SILVER RECOVERY

This application is a 371 of PCT/US99/10489 filed Jun. 3, 1999 which is a continuation-in-part of U.S. Ser. No. 09/090,512 filed Jun. 4, 1998 now abandoned.

The present invention provides for compositions for improving precious metals recovery for heap leach agglomerations.

BACKGROUND OF THE INVENTION

In recent years, the use of chemical leaching to recover minerals from low grade ores has grown. For example, caustic cyanide leaching is used to recover gold from low grade ores having about 0.02 ounces of gold per ton. Such leaching operations are typically carried out in large heaps. The mineral bearing ore from an open pit mine is crushed to produce an aggregate that is coarse enough to be permeable in a heap but fine enough to expose the precious metal values in the ore to the leaching solution. After crushing, the ore is formed into heaps on impervious leach pads. A leaching solution is evenly distributed over the top of the heaps by sprinklers, wobblers, or other similar equipment at a rate of from about 0.003 to 0.005 gallons per minute per square foot. As the barren leaching solution percolates through the heap, it dissolves the gold contained in the ore. The liquor collected by the impervious leach pad at the bottom of the heap is recovered and this "pregnant solution" is subjected to a gold recovery operation. The leachate from the gold recovery operation is held in a barren pond for reuse.

Economical operation of such heap leaching operations requires that the heaps of crushed ore have good permeability after being crushed and stacked so as to provide good contact between the ore and the leachate. Ores containing excessive quantities of clay and/or fines (i.e., 30% by weight of −100 mesh fines) have been found undesirable due to their tendency to slow the percolation flow of the leach solution. Slowing of the percolating flow of leach solution can occur when clay fines concentrate in the center of the heap while the large rock fragments tend to settle on the lower slopes and base of the heap. This segregation is aggravated when the heap is leveled off for the installation of the sprinkler system that delivers the leach solution. This segregation results in localized areas or zones within the heap with marked differences in permeability. The result is channeling where leach solution follows the course of least resistance, percolating downward through the coarse ore regions and bypassing or barely wetting areas that contain large amounts of fines. Such channelling produces dormant or unleached areas within the heap. The formation of a "slime mud" by such fines can be so severe as to seal the heap causing the leach solution to run off the sides rather than to penetrate. This can require mechanical reforming of the heap. The cost in reforming the heaps which can cover 160 acres and be 200 feet high negates the economics of scale that make such mining commercially viable.

In the mid-1970's, the United States Bureau of Mines determined that ore bodies containing high percentages of clay and/of fines could be heap leached if the fines in the ore were agglomerated. The Bureau of Mines developed an agglomeration process in which crushed ore is mixed with Portland Cement at the rate of from 10 to 20 pounds per ton, wetted with 16 to 18% moisture (as water or caustic cyanide), agglomerated by a disk pelletizer and cured for a minimum of 8 hours before being subjected to stacking in heaps for the leaching operation. When processed in this maimer, the agglomerated ore was found to have sufficient green strength to withstand the effects of degradation caused by the heap building and leaching operations.

In commercial practice, the method developed by the United States Bureau of Mines has not met with widespread acceptance because of the cost and time required. However, the use of cement, as well as lime, as agglomerating agents is known. Agglomerating practices tend to be site specific and non-uniform. Typically, the action of the conveyor which moves the ore from the crusher to the ore heaps or the tumbling of ore down the conical pike is relied on to provide agglomeration for a moistened cement-ore mixture. Lime has been found to be less effective than cement in controlling clay fines. It is believed this is because the lime must first attack the clay lattice structure in order to provide binding.

Cement has been found to be most effective in high siliceous ores (crushed rock) and noticeably less effective in ores having a high clay content. With the growth of such mining methods, the need for cost effective, efficient agglomerating materials has grown.

SUMMARY OF THE INVENTION

The present invention discloses a composition for enhancing the ability of a lixivant to extract precious metals from heap leach agglomeration ores. The compositions comprise a polypropylene glycol and nonylphenol ethoxylate in a paraffin oil solvent.

DESCRIPTION OF THE PREFERRED EMBODIMENTS

The present invention relates to methods and compositions for improving the ability of a lixivant to extract precious metal ores from a heap of ores.

The compositions comprise a polypropylene glycol and alkyl phenol ethoxylate in a paraffin oil solvent. Optionally, an alcohol can be employed in the composition.

The polypropylene glycols are conventionally produced by polymerizing propylene oxide in the presence of an alkaline catalyst. Preferably, the polypropylene glycol has a molecular weight of about 400 to about 2000. The preferred polypropylene glycols are polypropylene glycol monooleate, most preferably with molecular weights of about 400. This compound is commercially available from Lonza as PEG 400 MOT.

The alkylphenol ethoxylate compounds generally have the formula:

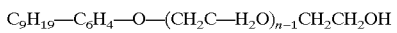

$$C_9H_{19}-C_6H_4-O-(CH_2C-H_2O)_{n-1}CH_2CH_2OH$$

where n=9 to 40.

Of these compounds, nonylphenol ethoxylates are preferred with nonylphenol with 6 moles ethoxylate most preferred. This compound is commercially available as Triton® N-60 from Rohm & Haas or Tergitol® NP-6 from Union Carbide.

The paraffin oil solvent is generally selected from those hydrotreated petroleum distillates having 10 to 18 carbon atoms such as mineral oil. This solvent is commercially available as Varsol® or Exxsol® D-40 from Exxon Chemicals.

The optional alcohol is preferably a straight chain or branched alkyl alcohol having from 1 to 8 carbon atoms in the chain. Preferably this alcohol is octyl alcohol or N-octanol which is available commercially as Epal® 8 from Amoco Chemicals.

The compositions of the present invention improve the ability of heap leaching solutions or lixivants to extract precious metals from agglomerated heaps of ore. The compositions are particularly effective in gold and silver recovery. The compositions prove effective in a variety of ores and are particularly effective in sedimentary ore and volcanic ore.

The compositions generally comprise from about 1 to about 5 weight percent of polypropylene glycol and from about 1 to about 15 weight percent of alkylphenol ethoxylate with the remainder being the paraffin oil solvent. The optional alcohol may be included at a range of from about 1 to about 10 percent.

A preferred composition comprises 2.0% of polypropylene glycol 400 monooleate, 10.0% of nonylphenol with 6 moles ethoxylate, 4.0% of N-octanol with the remainder (84%) paraffin oil solvent.

The total amount of the inventive composition used in the methods of the present invention is that amount which will be sufficient to enhance the ability of the lixivant to extract precious metal from ore. This amount will vary, of course, due to the type of ore, amount of lixivant employed and type of precious metal sought to be recovered.

For purposes of the present invention, the term "effective amount" is that amount of inventive composition which will aid in increasing precious metal recovery.

This amount will range from about 10 grams to about 50 grams of inventive composition per ton of ore. Preferably, this amount is about 30 grams per ton of ore.

The composition of the present invention may be added to the heap by any conventional method, either separate from the lixivant or as a combination with the lixivant.

In order to more clearly illustrate the invention, the data set forth below were developed. The following examples are included as being illustrations of the invention and should not be construed as limiting the scope thereof.

EXAMPLES

The ability of the inventive composition to improve the ability of caustic cyanide lixivant to extract previous metals from ore was demonstrated using standard laboratory column testing. In laboratory column testing, cyanide at high pH was percolated onto crushed ore (approximately 3/8 inch mesh) in a column. The effectiveness of any additive is evidenced by an increase in percent extraction with increased additive dosage. Table I summarizes the results of the percolation testing using this procedure on a volcanic ore and a sedimentary ore. Dosages of the additive ranged from 0 to 50 ppm.

TABLE I

Heap Leach Wetting Agent

| Ore Type | Gold Extraction (%) | Silver Extraction (%) | Dosage (ppm) |
| --- | --- | --- | --- |
| Volcanic Ore | 47.78 | 34.14 | 0 |
| Volcanic Ore | 46.16 | 48.41 | 20 |
| Volcanic Ore | 51.04 | 43.35 | 30 |
| Volcanic Ore | 50.93 | 46.50 | 50 |
| Sedimentary Ore | 75.23 | 60.30 | 0 |
| Sedimentary Ore | 84.16 | 54.77 | 20 |
| Sedimentary Ore | 85.25 | 69.07 | 30 |
| Sedimentary Ore | 78.41 | 73.80 | 50 |

These test results demonstrate that a composition comprising 2.0% polypropylene glycol 400 monooleate, 10.0% nonylphenol with 6 moles ethoxylate, 4.0% N-octanol and 84.0% paraffin oil solvent was effective at increasing the recovery of both gold and silver in two different kinds of ore. The two ores represent very different geologies and indicate that the inventive treatment will increase precious metal recovery in a variety of ores.

While this invention has been described with respect to particular embodiments thereof, it is apparent that numerous other forms and modifications of this invention will be obvious to those skilled in the art.

The appended claims and this invention generally should be construed to cover all such obvious forms and modifications which are within the true spirit and scope of the present invention.

What is claimed is:

1. A method of increasing the recovery of precious metals from ore during heap leaching comprising adding to the ore a composition comprising polypropylene glycol and alkylphenol ethoxylate in a paraffin oil solvent in an amount effective to increase the recovery of precious metals from the ore during heap leaching.

2. The method as claimed in claim 1 wherein said polypropylene glycol is polypropylene glycol monooleate having a molecular weight of 400.

3. The method as claimed in claim 1 wherein said alkylphenol ethoxylate has the formula:

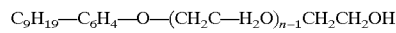

$$C_9H_{19}-C_6H_4-O-(CH_2C-H_2O)_{n-1}CH_2CH_2OH$$

where n=9 to 40.

4. The method as claimed in claim 3 wherein said alkylphenol ethoxylate is nonylphenol with 6 moles ethoxylate.

5. The method as claimed in claim 1 further comprising an alcohol.

6. The method as claimed in claim 5 wherein said alcohol is N-octanol.

7. The method as claimed in claim 1 wherein said composition is added in an amount ranging from about 10 grams to about 50 grams per ton of ore.

8. The method as claimed in claim 1 wherein said ore is selected from the group consisting of volcanic ore and sedimentary ore.

9. The method as claimed in claim 1 wherein said precious metal is selected from the group consisting of gold and silver.

10. The method as claimed in claim 1 wherein said heap leaching is performed with a cyanide solution.

11. A composition comprising a polypropylene glycol an alkylphenol ethoxylate and a paraffin oil solvent.

12. The composition as claimed in claim 11 wherein said polypropylene glycol is polypropylene glycol monooleate having a molecular weight of 400.

13. The composition as claimed in claim 11 wherein said alkylphenol ethoxylate has the formula:

$$C_9H_{19}-C_6H_4-O-(CH_2C-H_2O)_{n-1}CH_2CH_2OH$$

where n=9 to 40.

14. The composition as claimed in claim 13 wherein said alkylphenol ethoxylate is nonylphenol with 6 moles ethoxylate.

15. The composition as claimed in claim 11 further comprising an alcohol.

16. The composition as claimed in claim 15 wherein said alcohol is N-octanol.

17. The composition as claimed in claim 11 comprising from about 1 to about 15 weight percent of polypropylene glycol and from 1 to about 5 weight percent of alkylphenol ethoxylate with the remainder being paraffin oil solvent.

18. The composition as claimed in claim 11 comprising 2.0 percent of polypropylene glycol 400 monooleate, 10.0 percent of nonylphenol with 6 moles ethoxylate, 4.0 percent of N-octanol and 84.0 percent paraffin oil solvent.

* * * * *